April 3, 1928. 1,665,017
J. C. BERGNER
COOKING APPARATUS
Original Filed July 10, 1919  2 Sheets-Sheet 1
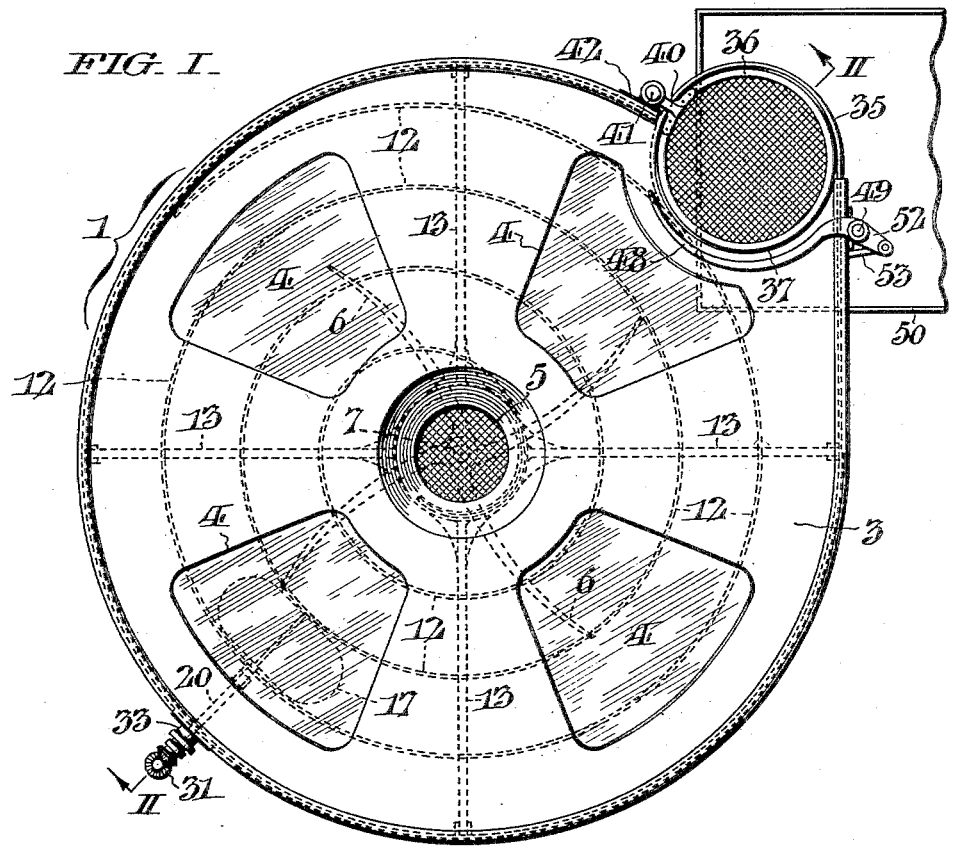
FIG. I.
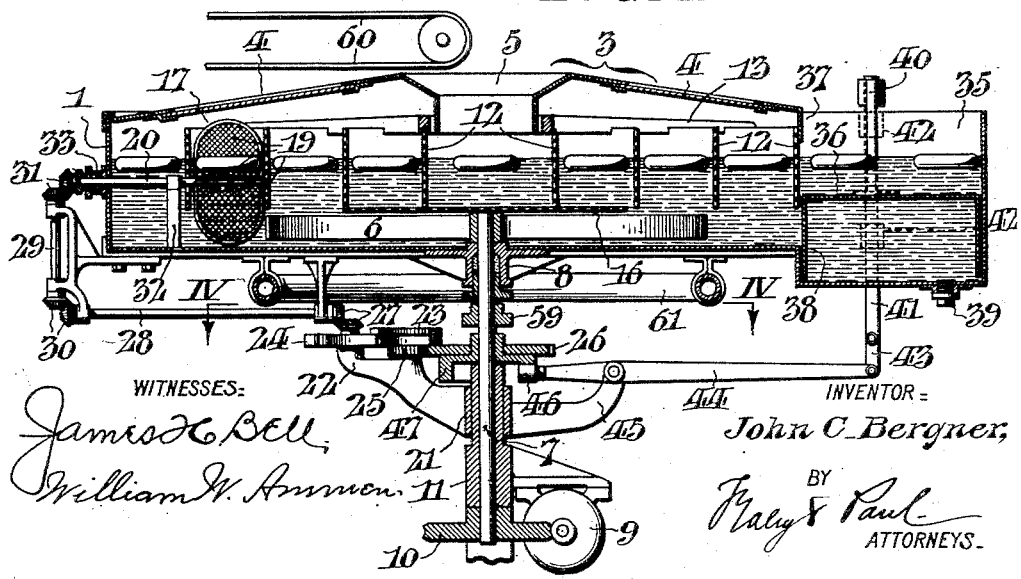
FIG. II.
WITNESSES:
James H. Bell
William W. Ammen
INVENTOR:
John C. Bergner
BY
Haly & Paul
ATTORNEYS.

April 3, 1928.  1,665,017
J. C. BERGNER
COOKING APPARATUS
Original Filed July 10, 1919   2 Sheets-Sheet 2
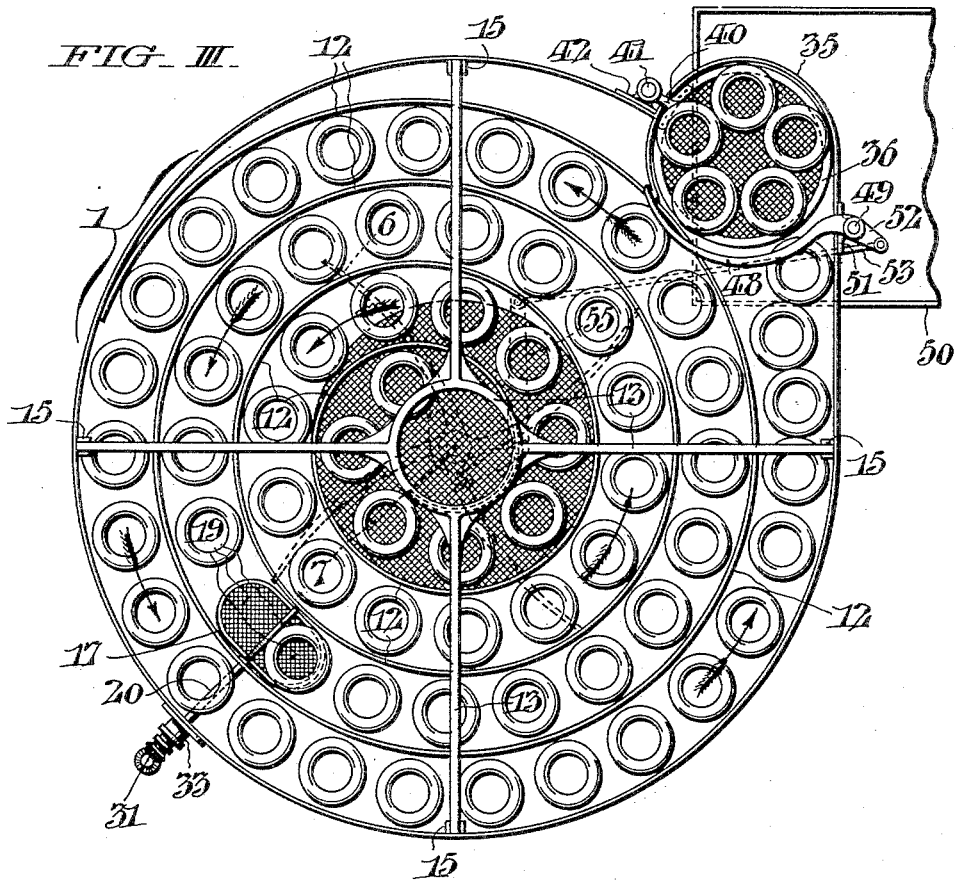
FIG. III
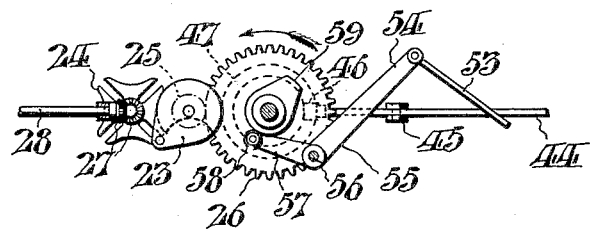
FIG. IV
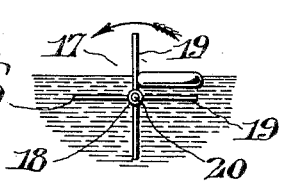
FIG. V
WITNESSES:
James H. Bell
William W. Ammon
INVENTOR:
John C. Bergner
BY
Raley & Paul
ATTORNEYS Patented Apr. 3, 1928.

1,665,017

UNITED STATES PATENT OFFICE.

JOHN C. BERGNER, OF LANSDOWNE, PENNSYLVANIA, ASSIGNOR OF ONE-HALF TO FRANK ELLIS MORRIS, OF PHILADELPHIA, PENNSYLVANIA.

COOKING APPARATUS.

Application filed July 10, 1919, Serial No. 309,899. Renewed July 30, 1927.

My invention relates to cooking apparatus, and more especially to apparatus in which a heated fluid or liquid is employed to accomplish the cooking. I aim to secure rapid and continuous output from the apparatus, as well as simplicity of operation and superior quality, appearance, and uniformity of the product.

I have found that these and other advantages can be obtained by progressing the articles that are being cooked through the apparatus with the least possible contact with anything except the cooking fluid, preferably under propulsion by the fluid itself, and afloat therein or supported thereby against, or so as to obviate, deformation. Raw articles to be cooked may be introduced into the apparatus, and fully cooked ones discharged or ejected therefrom, by suitable adjunctive or accessory means; and buoyant articles travelling quite afloat at the surface of the hot liquid may, likewise, be turned over at an intermediate stage of cooking or in the course of their travel through the apparatus, to insure proper cooking on both sides. By suitable motion or circulation of the fluid, the latter can be made to propel the articles over a sufficiently extended circuitous course in a relatively small space, and thus great cooking capacity can be secured in a very compact and convenient apparatus. The utmost compactness is attained by whirling the articles in a gyratory or circling course several times around in the cooking vessel or receptacle. The cooking fluid may be circulated with a whirling movement, and the raw articles successively dropped into the moving fluid and thereby carried through the apparatus with several circling rounds, one within another.

From this brief explanation, and from my description hereinafter of the best form of embodiment of my invention at present known to me, it will be apparent to those skilled in the art that the invention affords various devices, features of operation and construction, and combinations or arrangements of parts that are in themselves novel and useful,—either alone, or in other connections or relations than here shown. It will also be seen that the embodiment of my invention here described and illustrated is completely automatic in operation. It will, furthermore, be apparent that the invention is very suitable and useful for cooking articles such as doughnuts, which are dealt with free (as distinguished from canned products), and are naturally liable to disruption or deformation, or to distortion of their preferred annular form, especially in the earlier stages of cooking. Doughnuts, in particular, become buoyant in the cooking liquor soon after they begin to cook, notwithstanding that they are initially heavier than the liquor.

In the drawings, Fig. I, is a plan view of a cooking apparatus conveniently embodying my invention.

Fig. II, is a sectional view of the same, as viewed in the direction of the arrows II—II, in Fig. I.

Fig. III, is a plan view similar to Fig. I, the cover having, however, been removed in this instance to facilitate a detailed showing of the parts beneath.

Fig. IV, is a detail plan sectional view taken along the plane IV—IV, in Fig. II, and Fig. V, is a detail view of the means by which the articles being cooked, are inverted during their passage through the apparatus.

Referring more particularly to Figs. I, II and III, 1, indicates a comparatively shallow circular receptacle or pan in which an ample quantity of a suitable cooking fluid is maintained. This pan is supported upon a spider frame 2, and the latter in turn sustained in any approved manner as by a floor stand or table, not shown. The pan is provided with a cover 3, having a series of glass protected sight openings 4, through which the behavior of the apparatus may, at any time, be observed during the cooking operation, and also a central opening 5, through which the articles to be cooked are dropped into the apparatus. Centrally within the bottom of the pan, rotates a slowly moving, multi-armed, submerged paddle 6, which causes the cooking fluid to whirl constantly in a gyratory course in the general direction of the arrows in Fig. III. This paddle is fixed to the upper end of a vertical driving shaft 7, which enters the pan bottom through a stuffing box 8, and may be driven by any convenient available means, such for example as an electric motor conventionally represented at 9, in Fig. II, and there shown as driving said shaft through a worm gear 10. Shaft 7, is otherwise supported and journalled in a bearing 11, which may form a part of a floor stand such as previously described.

In the operation of the apparatus, the whirling of the fluid induced by the paddle serves to propel the floating articles to follow the course determined by a spiral guide 12. This guide may be either of wire mesh, or foraminated metal so as to offer the least possible resistance to the ready passage of the fluid therethrough, and is suspended from a four armed spider frame 13, having its extremities supported upon lugs or brackets 15, attached to the inner periphery of the pan, as clearly shown in Fig. III. This arrangement permits of the ready removal of the guide for cleaning purposes. The whirling fluid not only circulates around the pan, but also outward and inward in a radial sense to a certain extent, partly through the foraminous guide 12.

As best seen in Fig. II, the lower edges of the convolutions of the guide spiral 12, terminate somewhat above the plane of the paddle, and at the region of the inlet opening 5, I provide a perforated or foraminous diaphragm 16, which prevents the articles from dropping into the field of operation of the paddle when initially dropped into the apparatus.

Approximately midway of the spiral course of travel above described, the apparatus is supplemented with an intermittently operative turning device 17, by which the articles, after having travelled to this point in one position, are successively inverted, so that their other sides are directly subjected to the action of the cooking fluid for the completion of the operation. This feature is important in that it insures thorough cooking and, in some cases, a uniform browning of the articles. The turning device has a central hub 18, from which extend a number of radial supporting surfaces 19, preferably constructed as grids of wire mesh or perforated metal. The shaft 20, upon which the turning device is mounted, is disposed at a region below the liquor level so that when the device is in the rest position shown in Figs. II and V, one of the articles is permitted to float over the top of the supporting surface or grid occupying a submerged active position in its path of travel, and temporarily arrested by the predecessor of the latter, so that upon the next operation of the device, the article is turned over, immediately released and again freed to the action of the moving liquor. In the instance illustrated, the turning device consists of four arms and is adapted for rotation in steps of 90°, under actuation of a controlling mechanism which may be briefly described as follows:

Clamped to the upper end of the bearing 11, for the driving shaft 7, is a bracket sleeve 21, from which extends an integral arm 22. Upon this arm are rotatively mounted, the elements 23 and 24, of a Geneva movement, of which the driving element 23, is actuated by a pinion 25, meshing with a gear 26, fixed upon the main driving shaft 7. The driven element 24, of the Geneva couple imparts its motion through miter gears 27, to a horizontal shaft 28, which in turn transmits its motion through an interposed vertical shaft 29, having miter gear connections 30 and 31, to the shaft 20, of the turning device. The latter shaft is rotatively supported within the pan by a bracket 32, and protrudes through a stuffing box 33, at the side of the pan, to the exterior.

After the articles have completed their circuit through the pan as above noted, they are received within an offset or trap 35, forming a part of the pan 1, said offset communicating directly with the outer or terminal round of the spiral course as clearly shown in Fig. III. Within the offset intermittently operates a vertically reciprocating elevator 36, whose foraminous upper surface normally occupies a submerged position in the path of the articles so that the cooked articles may readily float over the top of the same. This elevator is preferably of circular contour and of a surface area sufficient to support a number of the articles at a time. At each operation of the elevator the group of articles trapped in the offset 35, is elevated from the liquor to a level slightly above the edge of the pan. From Figs. I and II, it will be noted that the cover 3, of the pan is appropriately cut away at 37, to permit the action of the elevator, and that the latter is provided with a depending peripheral guard 38, which, when the elevator is raised, prevents the articles from floating beneath the supporting surface of the same. In order to accommodate said guard, the offset trap 35, is somewhat deeper than the pan proper as best seen in Fig. II. The pocket thus established is further useful in insuring a thorough draining of the pan when it is desired to clean the same, a screw plug 39, being provided for this purpose. The elevator 36, is supported by a bracket 40, fixedly attached to a vertical slide rod 41, guided in bearings 42, secured to the outer side of the pan. The lower end of the said rod is connected through a coupling link 43, with one extremity of a lever 44, fulcrumed to an arm 45, extending from the bracket sleeve 21, which has already been described. The opposite end of the lever 44, supports a roller 46, which co-operates with a crown cam 47, mounted upon the main driving shaft 7, see Fig. II.

This cam is so designed as to cause a dwell of the elevator at the end of its movement in either direction, so that when the latter is in its lower position, the articles are given an opportunity to collect within the trap, and when in its upper position, ample time is afforded to permit ejection of the cooked articles from the apparatus. This latter function is vested in an ejector having the form of an arcuate arm 48, normally occupying the position illustrated in Figs. I and III. This arm is fixed to the upper end of an oscillating shaft 49, whose movements are regulated in proper timed relation with the action of the elevator, so that just after that latter has reached its upper position, the ejector arm 48, is caused to sweep across the supporting surface of said elevator, to remove the articles therefrom. After such ejection, the articles may be disposed of in any convenient manner. In the present instance, a receiving receptacle has been conventionally represented at 50.

The oscillating shaft 49, for the arm 48, is supported by brackets 51, secured to the exterior of the pan, and is actuated through the instrumentality of an arm 52, fixed to its lower end. Said arm is connected by a tie rod 53, to one arm 54, of a bell crank lever 55, fulcrumed about a fixed pivot 56, and having its other arm 57, provided with a roller 58, subject to the influence of a cooperative cam 59, the latter being mounted upon the main driving shaft 7.

The articles to be cooked may be introduced from above, either directly dropped into the receiving opening 5 in the cover of the apparatus from a forming machine (not shown), or delivered thereto by a conveyer such as conventionally represented at 60, in Fig. II.

For the purposes of heating the cooking fluid, I have in the present instance shown diagrammatically a gas burner 61, which is preferably a tube of circular form, so that the heat may be evenly distributed.

The operation of the apparatus is briefly as follows:

As the articles are successively dropped into the apparatus, they are immediately carried along under the gyratory, whirling movement of the fluid set up by the paddle as already noted and are obliged to follow the course determined by the spiral 12, thus gradually working their way from the center of the apparatus toward the periphery of the pan. In the course of their travel, said articles are successively inverted by the revolvable grid turning device 17, and after completing the circuit in the pan are trapped in groups in the offset 35. By the properly timed co-operation of the elevator 36, and the ejector arm 48, the articles are discharged from the apparatus in a manner clearly set forth in the previous description.

Having thus described my invention, I claim:

1. A cooking apparatus comprising a receptacle or pan for a cooking fluid; and means for whirling the liquor in a gyratory course to convey the articles to be cooked through the apparatus.

2. A cooking apparatus comprising a receptacle or pan for a cooking fluid; means for whirling the fluid in the pan; and means for guiding the articles to be cooked over a gyratory course within the pan whilst propelled by the moving fluid.

3. A cooking apparatus comprising a circular receptacle or pan for a cooking fluid; means for whirling the fluid in the pan; and means for guiding the articles to be cooked over a circuitous course within the pan under the propulsion of the fluid.

4. A cooking apparatus comprising a circular receptacle or pan for a cooking fluid; a rotary paddle adapted to whirl the fluid in the pan; and means for guiding the articles to be cooked over a spiral course within the pan whilst propelled by the moving fluid.

5. A cooking apparatus comprising a circular receptacle or pan for a cooking fluid; a rotary paddle adapted to whirl the fluid in the pan; means for guiding the articles to be cooked over a circuitous course in the pan under the propulsion of the moving fluid, the latter means including a spiral guide suspended above said paddle and having its convolutions extending below the level of the fluid.

6. A cooking apparatus comprising a circular receptacle or pan for a cooking fluid; a cover for the said pan having an inlet opening and a discharge opening; means for whirling the cooking fluid within said pan; and means for guiding the articles to be cooked over a circuitous course in the pan under the propulsion of the moving fluid, from the region of the inlet opening to the discharge opening.

7. A cooking apparatus comprising a circular receptacle or pan for a cooking fluid; a cover for said pan having a central inlet opening and a discharge opening at its periphery; means for whirling the cooking fluid within the pan; and means for guiding the articles to be cooked over a circuitous course within the pan under the propulsion of the moving fluid, from the region of the said central inlet opening toward the outlet opening.

8. In apparatus for cooking articles with hot fluid, the combination of a receptacle for the hot cooking fluid in which the articles to be cooked are propelled by motion of the fluid over a gyratory course; a trap forming the terminus of said gyratory course; and a vertically reciprocating elevator in said trap for elevating the cooked articles above the fluid in the receptacle.

9. A cooking apparatus comprising a receptacle or pan for a cooking fluid; means for moving the fluid in the pan; means for guiding the articles to be cooked over a circuitous course within the pan under the propulsion of the moving fluid; a trap forming the terminus of said circuitous course; an elevator operating within said trap, said elevator normally occupying a position below the level of the fluid in the pan, so that the cooked articles may float over the top of the same; means for actuating the elevator to raise said articles above the liquor in the pan; and means for thereafter ejecting the articles from the elevator.

10. A cooking apparatus comprising a receptacle or pan for a cooking fluid; means for moving the fluid in the pan; means for guiding the articles to be cooked over a circuitous course within the pan under the propulsion of the moving fluid; a trap forming the terminus of said circuitous course; an elevator operating within the said trap, said elevator normally occupying a position below the level of the fluid in the pan so that the cooked articles may float over the top of the same; means for actuating the elevator to raise said articles above the liquor in the pan; a depending guard forming part of said elevator and adapted to temporarily arrest the succeeding articles when said elevator is in raised position; and means for ejecting the articles from the apparatus after being raised by the elevator.

11. A cooking apparatus comprising a receptacle or pan for a cooking fluid in which the articles to be cooked are propelled by motion of the fluid; and means for turning said articles during their travel through the apparatus, said turning means including an intermittently operative rotatable element having a number of radial supporting surfaces adapted to come to rest in succession in a horizontal position below the level of the fluid in the pan, so that the articles are permitted to float into position over the top of the same in readiness to be inverted upon the next succeeding rotative movement of said element.

12. In apparatus for cooking articles such as doughnuts, afloat in hot cooking liquor, means for introducing the articles, a rotary paddle for turning over the articles, and means for imparting intermittent flipping movement to the paddle to insure inversion of the articles.

13. In apparatus for cooking articles such as doughnuts, afloat in hot cooking liquor, means for introducing the articles, and means for progressing the articles, and intermittently revolving means for engaging the articles from beneath and turning them over by rapid flipping movement.

14. In apparatus for cooking articles such as doughnuts afloat in moving cooking liquor, intermittently-operative means for individually engaging the articles from beneath and turning them over by rapid flipping movement.

15. In apparatus for cooking articles such as doughnuts afloat in moving cooking liquor, an intermittently-operative rotary paddle for engaging the articles from beneath to lift them from the liquor and turn them over by rapid flipping movement.

16. In apparatus for cooking articles afloat in hot fluid, the combination of a receptacle for the fluid; and means submerged in the fluid beneath the floating articles, for moving the fluid to circulate the articles in the apparatus.

17. In apparatus for cooking articles afloat in hot fluid, the combination of a receptacle for the fluid; paddle means submerged in the fluid, beneath the floating articles, for moving the fluid to circulate the articles in the apparatus; and a foraminous diaphragm submerged in the fluid above said paddle means for preventing articles from coming in contact therewith.

18. In a doughnut cooking machine the combination of a vessel to hold the heated liquid, means to circulate the liquid in said vessel, and a revoluble grid or grids to turn over the doughnuts.

19. In a doughnut cooking machine the combination of a vessel to hold the heated liquid, means to circulate the liquid in said vessel, and an intermediate revoluble grid or grids to turn over the doughnuts.

20. An apparatus for cooking free articles in hot cooking liquor, the combination of a receptacle for the liquor, means for circulating the liquor, means for guiding the articles over a gyratory course in the receptacle incidental to propulsion by the liquor including a spiral extending outward from the center of the receptacle to its periphery, and intermittently-operative means for engaging the articles from beneath and turning them over by rapid flipping movement incidental to travel through the apparatus.

21. In apparatus for cooking free articles in hot cooking liquor, the combination of a receptacle for the liquor, means for moving the liquor in the receptacle, means for guiding the articles over a circuitous course within the receptacle under propulsion of the moving liquor, and intermittently operative means for engaging the articles from beneath and turning them by rapid flipping movement incidental to travel through the apparatus.

In witness whereof, I have hereunto signed my name at Philadelphia, Pennsylvania, this 7th day of July, 1919.

JOHN C. BERGNER.